Dec. 16, 1969  F. H. ATTIX  3,484,605
THERMOLUMINESCENT DOSIMETER
Filed July 27, 1967  3 Sheets-Sheet 2

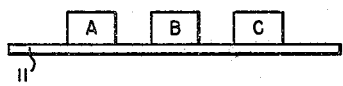
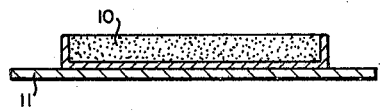
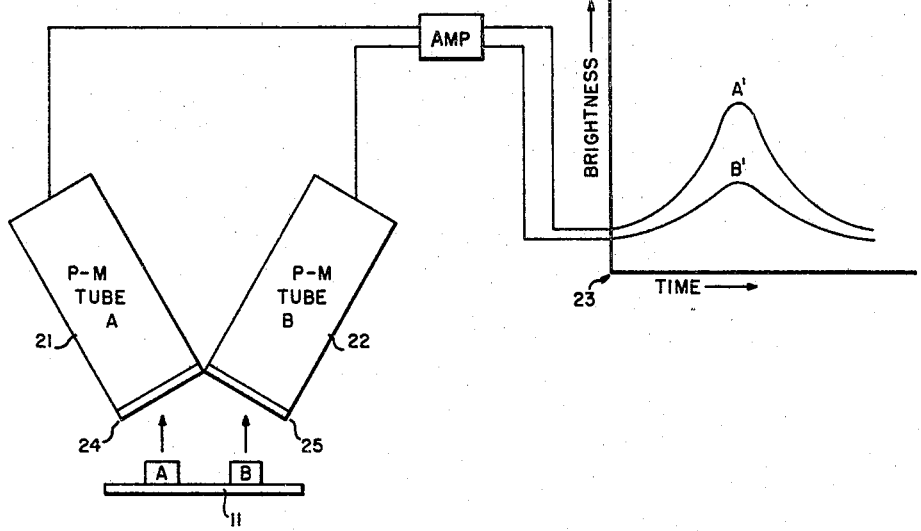

INVENTOR
FRANK H. ATTIX

BY *Melvin L. Crane* AGENT
*R. S. Sciascia* ATTORNEY

# United States Patent Office 3,484,605
Patented Dec. 16, 1969

3,484,605
THERMOLUMINESCENT DOSIMETER
Frank H. Attix, Hillcrest Heights, Md., assignor to the United States of America as represented by the Secretary of the Navy
Filed July 27, 1967, Ser. No. 656,991
Int. Cl. G01n 21/38
U.S. Cl. 250—71                    16 Claims

ABSTRACT OF THE DISCLOSURE

This invention is directed to dosimetry systems based on composite thermoluminescent dosimeters which are made up of a plurality of different thermoluminescent materials. Each of the materials responds in varying degrees to different types or energies of ionizing radiation. Following radiation exposure the dosimeter assembly (exclusive of any opaque or heat-damagable outer protective covering) is placed in a thermoluminescence fluorimeter of appropriate design and is heated to release and measure the stored latent light signals from the individual materials. These signals are separated from one another either by (a) measuring the separate glow peaks occurring at different times (either naturally, or artificially through the inclusion of thermal delays) during the heating cycle, (b) discrimination on the basis of differing emission spectra, and/or (c) discrimination on the basis of differing physical locations of the materials in the dosimeter, allowing separate viewing through separate optical systems. The separated signals are recorded and interpreted in terms of the dose or exposure components due to the various types or energies of ionizing radiation field.

---

The invention described herein may be manufactured and used by or for the Government of the United States of America for governmental purposes without the payment of any royalties thereon or therefor Thermoluminescent materials have the property of absorbing and storing energy from ionizing radiations, and of retaining this energy until heated, at which time the energy is emitted as light waves. Thus, an important use of thermoluminescent materials is in radiation dosimeters.

Prior art plural-material thermoluminescent dosimeters were merely dose-threshold detecting devices to determine whether or not the dosimeter had been exposed to more than a known minimum dose of radiation. If the dosimeter luminesced and emitted light above some arbitrary threshold level when heated, it was known that it had been exposed to more than the corresponding minimum dose level; however, the upper level of the dose was not determined thereby. If, however, the dosimeter did not emit at least the threshold level of light upon heating, then it was known that the dosimeter had not been exposed to this minimum amount amount of radiation. Patent No. 2,616,051 is directed to a thermoluminescence exposure meter including a plurality of thermoluminescing materials in a single dosimeter in which the materials were selected with differing levels of response to radiation, so that each had a different dose threshold at which it would luminesce with a detectable brightness. In this dosimeter the radiation dose to which it had been subjected was determined to be somewhere between the lowest threshold of the materials that luminesce and the highest threshold of that which did not. Such dosimeters were used for determining the amount of radiation of a single type of radiation. In the patented device the amount of radiation was determined by heating the dosimeter while visually observing the luminescence. Subsequent to the above mentioned patent, it was determined that, within some range of radiation exposures, the light emitted by a thermoluminescent dosimeter is approximately proportional to the radiation exposure which the dosimeter has received; therefore photo-sensitive devices such as photo-multipliers connected with amplification systems have been used to determine the amount of light emitted by the heated thermoluminescent material, thus providing an electric current which was indicative of the amount of radiation exposure.

Heretofore individuals working in areas of different types of radiation have sometimes worn a plurality of thermoluminescent dosimeters made up of different materials (or of the same material shielded from radiation to varying degrees) for detecting different types of radiation. These individual dosimeters may be housed in a common container or 'badge" for wearing, or they may be housed in separate containers. Each separate dosimeter is exposed to radiation while being worn on a person or elsewhere, and its thermoluminescent signal is later measured separately and independently from that of the others, even though they were exposed simultaneously. Thus, the radiation dose indication of each of the separate thermoluminescent dosimeters worn by the same person is measured separately, which involves considerable time and effort on the part of individuals checking the dosimeters for radiation dose.

This invention is directed to thermoluminescent dosimetry systems comprised of composite dosimeters which may be made of a plurality of different materials each of which are operative to indicate different types or energies of ionizing radiation, and of the thermoluminescence measuring devices suitably designed for reading such composite dosimeters. Each such composite dosimeter may be comprised of: (a) a mixture of granules or powders of the different thermoluminescent materials in a suitable container for placing in the radiation field; (b) a compact solid mixture of such materials, either grown as a mixed crystal or extruded or compressed or otherwise bound together by a cement or adhesive; (c) a plurality of containers (e.g. sealed glass vials) filled with different thermoluminescent materials; (d) a plurality of solid pieces of different thermoluminescent materials, or (e) a plurality of containers filled with (or solid pieces of) thermoluminescent materials shielded from radiation in differing degrees, so that, with respect to the radiation field, they respond as though they were different thermoluminescent materials. The dosimeter may be worn by an individual or attached to any other suitable object on which radiation dose is desired to be checked. After radiation exposure, the dosimeter materials are heated and the glow-peaks resulting therefrom (or the desired information they contain) are recorded. The materials used differ from each other in two important ways: (1) they respond differently to different components of the radiation field to which they have been exposed; and (2) their thermoluminescence signals either differ in (a) emission temperature, or (b) color (i.e., wavelength spectrum), or (c) the dosimeter materials are physically separated from each other sufficiently to allow their individual light signals to be delivered into separate light-gathering systems (e.g., light "pipes"). Thus a graphic display of light intensity vs. time as measured by a suitable light-detector (or detectors) viewing the dosimeter materials, will indicate the dose of each of the different types of radiation incident on the composite dosimeter. Alternatively other types of data display may be employed, e.g., visual reading meters, punch cards, punch or magnetic tape, or other means known to those familiar with data-display techniques.

It is therefore an object of the present invention to provide a composite thermoluminescent dosimeter which may measure more than one component of a mixed ionizing radiation field.

Another object is to provide a composite thermoluminescent dosimeter containing individual parts which are affected in differing degrees by different components of a mixed ionizing radiation field.

Still another object is to provide various methods for measuring the thermoluminescent signals from composite thermoluminescent dosimeters made in accordance with this invention during a single heating cycle.

Yet another object is to provide various methods of discriminating between the thermoluminescent emissions resulting from individual components of mixed types (or energies) of ionizing radiations incident on different materials that form a composite thermoluminescent dosimeter.

Other objects and advantages of the present invention will hereinafter become more fully apparent from the following description of the annexed drawings wherein:

FIG. 1 represents a plurality of different thermoluminescent materials (e.g., three) comprising a composite dosimeter, being heated by a hot plate to emit light therefrom at different temperatures due to radiation exposure of different types or energies;

FIG. 1 also illustrates a composite dosimeter comprised of a plurality of materials permanently affixed on a substrate layer (which thereby becomes an integral part of the dosimeter), which dosimeter is to be heated for release of thermoluminescence by heating the substrate;

FIG. 2 illustrates a granulated mixtures of different thermoluminescent materials together comprising the composite dosimeter, heated by a hot plate, wherein each of the different materials are excited to emit light at different temperatures;

FIG. 2 also illustrates a composite dosimeter in which the mixture of different thermoluminescent materials is permanently cemented, compressed, extruded or otherwise compacted into a single wafer, pellet, rod, or other shaped volume, to be heated either by an external heat source or by a heating element upon which it is permanently affixed;

Figure 4:
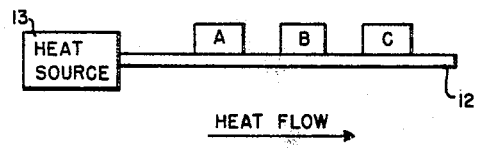
FIG. 4 represents different pieces of exposed thermoluminescent material comprising a composite dosimeter, such as shown in FIG. 1, in which a graded heat source is used such that the glow-peaks of the different materials may be more completely separated in time, due to heat delay.
Figure 5:
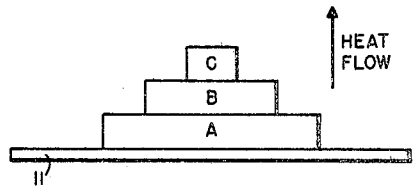
Figure 6:
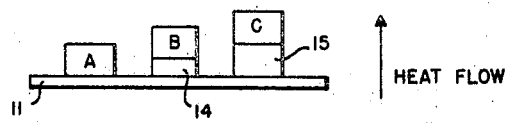
Figure 7:
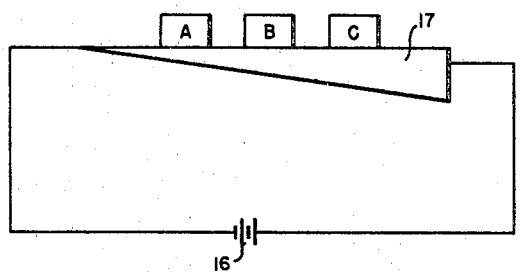
Figure 9:
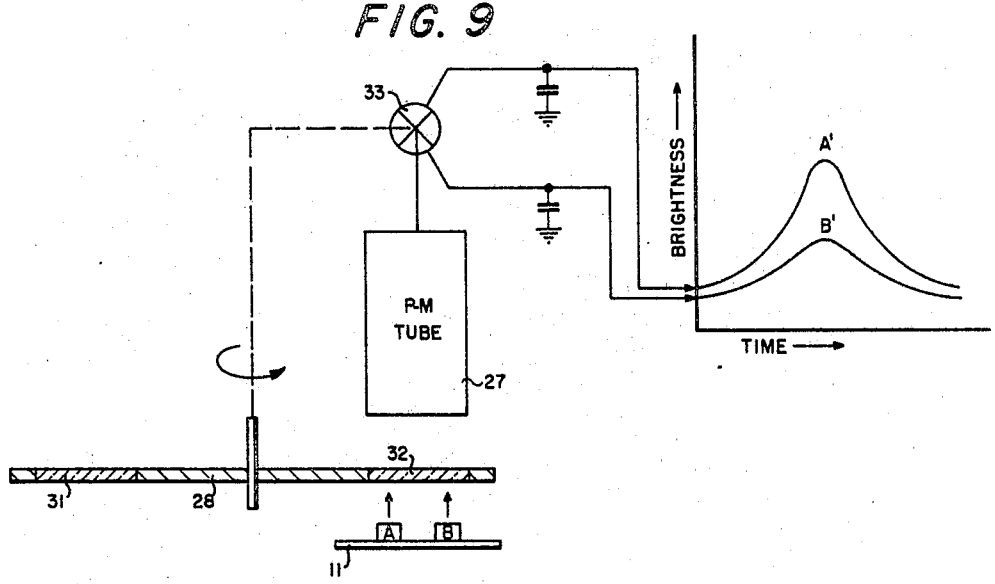

FIG. 4 also illustrates a composite dosimeter comprised of a plurality of pieces of different thermoluminescent materials permanently affixed to a thermally conductive plate or rod, which thereby becomes an integral part of the dosimeter, and which is heated from one end by some means;

FIG. 5 illustrates different thermoluminescent materials stacked upon each other, comprising a composite dosimeter, placed on a hot plate, in order to separate glow-peaks due to a time delay in the heating of the different materials;

FIG. 5 also illustrates a plurality of thermoluminescent materials permanently affixed to each other to comprise the composite dosimeter, which may be heated on a hot plate;

FIG. 5 further illustrates a plurality of thermoluminescent materials permanently affixed to each other and to a thermally conductive substrate which thereby becomes an integral part of the dosimeter, which is heated by heating the substrate by some means;

FIG. 6 illustrates different materials of a composite dosimeter placed on a hot plate with two of the different materials placed on spacers of different thickness (or thermal conductivity) which separates their glow-peaks in time due to a delay in the heat applied to the different materials;

FIG. 6 likewise represents a plurality of pieces of different thermoluminescent materials permanently affixed to various thermal-delay spacers and in turn to a thermally conductive substrate, all of which together comprise the composite thermoluminescent dosimeter, which can be heated by heating the substrate by some means;

FIG. 7 illustrates still another type of heating arrangement, in which the thermoluminescent materials comprising the composite dosimeter are placed on an ohmic heater strip having graded resistance (or areas of differing resistance), causing the materials to be heated at different rates, thus separating their light signals as a function of time;

FIG. 7 also illustrates a composite dosimeter comprised of a plurality of pieces of different thermoluminescent materials permanently affixed to a graded- or stepped-resistance substrate or wire, which thereby becomes an integral part of the dosimeter, and is heated by passing an electric current through it;

FIG. 8 illustrates the use of a plurality (e.g., two) separate photo-multiplier tubes in a detector system for a plural-material composite dosimeter, which displays separate curves on a brightness vs. time graph;

FIG. 8 also represents a composite dosimeter comprised of a plurality of pieces of different thermoluminescent materials permanently affixed to a substrate (which thereby becomes an integral part of the dosimeter), at stations which are viewed by separate light-collecting systems;

FIG. 9 illustrates still another recorder indicator system which presents (e.g., two) separate graphs displaying brightness vs. time for the separate plural materials of a composite dosimeter, differing in the light colors they emit; and FIG. 9 also illustrates a similar composite dosimeter wherein the pieces of different thermoluminescent materials are permanently affixed to a substrate which thereby becomes an integral part of the dosimeter.

Any and all of the above illustrated composite dosimeters may, within the teachings of the present invention, be further enclosed within a sealed container to exclude atmosphere and/or to contain another gas, following the prior invention of Schulman (Patent No. 3,115,578).

In carrying out the teaching of this invention thermoluminescent dosimeters are made which comprise two or more samples of different thermoluminescent materials each of which respond differently in varying degrees to different types or energies of ionizing radiation. Let's assume that a desired dosimeter is made with a granulated mixture of different materials A, B, and C or with a cluster of samples of different materials A, B, and C and are irradiated by a radiation field including types 1, 2, and 3. Then if the different dosimeter materials are heated by one of the methods as shown in the drawings FIGS. 1, 2, and 4–7, different "glow-peaks" will result as represented by the light intensity vs. time curve shown in FIG. 3. If sample material A responds only to radiation of type 1, sample material B responds only to radiation type 2, and radiation material C responds to only radiation type 3, and if each glow-peak height or area is calibrated in terms of suitable dosimetric units (e.g. roentgens, rads) then the glow peaks shown in FIG. 3 indicate the individual components of the total dose. Likewise, if material sample A responded to radiation type 1, while material sample B responded to radiation types 1 and 2, then the calibrated height or area of glow-peak B minus that of A would give the dose contribution of type 2 radiation. Also, if the peak-height or area ratio of glow-peaks $B^1$ to $A^1$ were a function of some physical parameter of the radiation field (e.g. the average quantum energy of a $\gamma$-ray field), then the ratio would serve as a measure of that perimeter.

Figure 3:
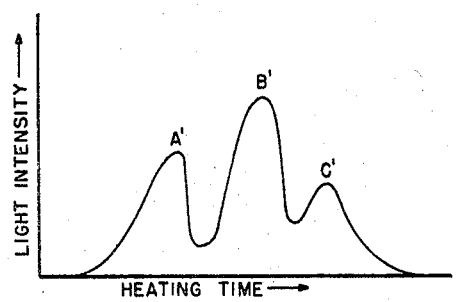
FIG. 3 illustrates a graph of light intensity vs. time, as measured by a light-detector placed above the dosimeter materials illustrated by FIGS. 1 and 2, the peak heights (or areas, if sufficiently well separated) representing doses of different types of radiation incident on the different materials.

As a specific example, consider the thermoluminescent materials A=LiF:Mg, Ti, Al and B=CoF$_2$:Mn. The latter has its principle glow peak typically at $\approx$ 280° C.

for $B^1$, the former at $\approx 210°$ C. for $A^1$ (FIG. 3). The relatively high atomic number of $CaF_2$ compared to that of air causes its response per roentgen to increase strongly with decreasing γ-ray quantum energy, while the LiF response per roentgen remains essentially constant. Thus, the ratio of heights or areas of glow peaks $B^1/A^1$ in FIG. 3 would increase with decreasing quantum energy, thereby providing a measure of the average γ-ray energy of the field.

Another example would be the use of these same two materials, but where $Li^6F$, (which has a large thermal-neutron reaction cross section due to the enrichment of $Li^6$ present) is used instead of ordinary LiF. In a mixed field of γ-rays and thermal neutrons, both materials would respond to the γ-rays, while only the $Li^6F$ would respond to the thermal neutrons. $Li^6F$ has the same 210° C. glow-peak temperature as regular LiF: thus it would still be separtaed from the $CaF_2$ glow-peak on the graph of brightness vs. time. Hence peak $A^1$ at 210° would indicate thermal neutron plus γ-ray does while peak $B^1$ at 280° C. would indicate only γ-ray dose.

FIG. 1 illustrates three different thermoluminescent materials A, B, and C, each of which respond differently to different components of a radiation field to which they are exposed, and their thermoluminescence takes place predominately at different temperatures. As shown, each of the different materials of the same composite dosimeter are positioned on a hot plate (or affixed to a substrate) 11, and heated simultaneously side-by-side. As the three different materials are heated simultaneously, heat will empty the charge-carrier traps in material A such that electrons and holes will be allowed to recombine at emitting centers, creating thereby a light-intensity vs. heating-time curve such as indicated by $A^1$, FIG. 3, measured by a suitable light-intensity detector and recorder. As the material is further heated with time, the traps in material B will be emptied, leading to the emission of light which is then detected and recorded; the same applies for material C. Thus, the graph $A^1$, $B^1$, $C^1$ of light intensity vs. time as measured by a light detector placed above the array of different samples as shown in FIGS. 1, 2, and 4–7 will appear as shown in FIG. 3.

The composite dosimeters made according to the teaching of this invention may comprise two or more samples of different thermoluminescent materials which respond differently to different types of ionizing radiation but which will produce glow-peaks at about the same temperature when heat is applied under identical conditions. In this case, the glow-peaks of the individual samples may be separated in time by introducing time delays of various durations in the heating process of the different samples of materials A, B, and C, as illustrated in FIGS. 4–7.

In FIG. 4 the different material samples are heated sequentially as heat flows through a heat conductor 12 which is placed in contact with a heat source 13 at one end thereof. As the heat source heats the conductor, the heat travels along the thermally conducting strip upon which the samples are located, thereby heating the samples in order of position away from the heat source.

FIG. 5 illustrates the different material samples stacked one above the other to cause the necessary heating delays in the upper pieces. The samples are placed on a hot plate (or fastened to a substrate) 11, which heats the samples in turn going from the hot plate outwardly therefrom. Grading the sizes of the samples, or viewing the samples from the side rather than from above, will eliminate the problem of light obscuration of one sample by another sample.

In FIG. 6, the samples are placed on a hot plate (or affixed to a substrate) 11, wherein the first sample is placed directly onto the hot plate, the second sample is placed onto a spacer 14 having a desired heat delaying effect and the third sample is placed onto a thicker spacer 15 having a desired greater heat-delaying effect. Thus, the three samples will be heated to a given temperature at successive times after the start of the heating process.

FIG. 7 illustrates still another way for accomplishing successive heating of the different materials placed thereon. As shown, an electrical source 16 is connected to an electrically conducting material 17 through which current passes. The resistance per unit length is greater at one end than at the other end e.g., by graduating the thickness thereof. Such a heating element will heat the different material samples placed thereon in succession, as described previously which will give a glow-peak curve in succession as shown by FIG. 3. The heating element may alternatively consist of segments, having different resistance per unit length, connected together electrically in either series or parallel. Such a structure forms a composite heating element having various parts which heat up at different rates.

The various heating methods as shown by FIGS. 1, 2, and 4–7 will produce glow-peaks at different times which would be similar to that represented by the glow-peaks illustrated by FIG. 3.

A specific example of the idea of separating similar glow-peaks in time is as follows: Let one sample be $Li^6F$. and the other be $Li^7F$. They emit identical glow curves after identical γ-ray exposures. However, $Li^7F$. is insensitive to thermal neutrons, in contrast to the large thermal-neutron sensitivity of $Li^6F$.:Mg. If two such samples are exposed together in a mixed neutron+γ-ray field, then briefly warmed to 150° C. to eliminate all but the principal 210° C. glow peak in both samples, and finally heated together in one of the methods described in FIGS. 4–7 (or some other scheme for accomplishing the same purpose), the height (or area) of the glow-peaks from the $Li^7F$. will be a measure of the γ-ray dose only, while that from the $Li^6F$. will be a measure of both neutron and γ-ray doses. The neutron dose will be obtained from the difference in readings.

Although these methods have been discussed in the foregoing paragraph as a way of separating in time the glow peaks issuing at the same temperature from two (or more) thermoluminescent samples, the reverse effect might also be useful for some special purpose. That is, one might employ one of these schemes to delay the emission of a relatively low-temperature glow peak from one sample to cause it to coincide in time with the emission of a higher-temperature glow-peak from a second sample.

Other methods of determining radiation dose by thermoluminescent dosimeters may be carried out by the apparatus shown in FIGS. 8 and 9.

FIG. 8 illustrates different materials A and B placed on a hot plate (or affixed to a substrate) 11, wherein a suitable light detector system is represented by photomultiplier tubes 21 and 22 which are connected to a suitable amplifier system (or systems) and recorded, wherein the output information is recorded by dual-pen recorder 23. In this arrangement, photo-multiplier tube 21 has, for example, a blue pass filter 24, and photomultiplier tube 22 has an orange pass filter 25. Such a system is useful where different materials A and B emit glow-peaks at the same temperature but of different colors, for instance wherein material A emits blue, material B emits orange. Thus, the sample materials A and B may be heated simultaneously and at the same temperature wherein different light will be emitted in which the light emitted is approximately proportional to the radiation dose received by each of the two different materials. The individual glow-peaks from the different materials are recorded on a dual-pen (or multi-channel) recorder or any other plural-display or recording device well known in the art.

A variation of the system shown in FIG. 8 is shown in FIG. 9. Only one photomultiplier tube 27 (or other suitable light detector) is employed here, but it must be sensitive to both colors of light. A rotating or translating shutter 28 is employed, containing appropriately-colored bandpass optical filters 31 and 32. A synchronized commutator 33 is connected to the photo-multiplier tube output, or a phase-synchronized amplifier may be used. Thus the photo-multiplier tube is viewing each sample only part of the time, and feeding each channel of the recorder only a corresponding part of the time. Smooth traces of glow curves $A^1$ and $B^1$ can be obtained by putting capacitors on the recorder input, and spinning the shutter wheel very rapidly compared to the time necessary to heat up the samples. More than two samples of different spectral emissions would also be possible.

A specific example of this mode of operation would be the use of $Li^7F$ as a γ-ray detector and $Li_2{}^6B_4{}^{10}O_7$:Mn as a γ-ray+thermal-neutron detector. The former material emits blue light, the latter orange, while both have their major glow peaks at 210–220° C.

The system illustrated in FIGS. 8 and 9 may also be used to determine the radiation dose on a mixture of granulated or compacted materials. In a thermoluminescent dosimeter having a mixture of, e.g., granulated materials A and B, the different materials in the mixture would produce either blue or orange light which would be detected by the instrumentation as set forth in FIGS. 8 and 9.

Still another approach may be used to determine radiation dose on different samples of material wherein the different materials are heated simultaneously.

In this approach one does not require separation of glow peaks in time, or that the emission spectra differ. The samples must be separated widely enough on the hot plate to allow the light from each one to be collected without interference from the others. FIG. 8 would represent one such scheme if the optical filters were eliminated and a light barrier inserted between the two samples, extending all the way up to the junction between the tubes, which would be suitably positioned. Mixed-material dosimeters of course could not be employed in this method.

Alternatively if a single photo-multiplier tube or other suitable light detector is sensitive to the light colors from all samples present, then a light-chopping wheel or shutter (see FIG. 9) can be employed to pass first the light from one sample, then another, and so on, repetitively. Optical filters could be used over the individual shutter openings if they improved the heat-signal rejection, but would not be needed to discriminate against other-sample signals, since only one sample at a time would be seen by the light detector. Rapid spinning of the shutter would again be required, compared to the time necessary to heat the samples.

As seen from the above discussion thermoluminescent dosimeters may be made of a plurality of thermoluminescent materials each of which responds in varying degrees to different types of energies of ionizing radiations. In checking the dosimeters for radiation dose the whole assembly is heated up in a single operation to release the stored light signals of the several materials which are representative of the radiation dose components. As set forth, the glow-peak signals may be separated from one another by various methods and/or instrumentation as shown in the drawings. The glow-peak signals are separated from one another either by (a) measuring the separate glow-peaks appearing at separate times either naturally or artificially through the inclusion of thermal delys, (b) discrimination on the basis of differing emission spectra, or (c) discrimination on the basis of differing physical locations of the materials in the dosimeter, allowing separate viewing through separate optical systems. The recorded separate signals are interpreted in terms of the strengths of the various components present in the radiation field.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A thermoluminescent dosimeter which comprises:
    a plurality of different thermoluminescent materials assembled into a unitary assembly,
    each of said different materials being of a type that responds in varying degrees to different dosage of different types of radiation,
    whereby simultaneous heating of said different materials produces light which is measured to determine the amount of each different radiation dose absorbed in each of said different materials.

2. A thermoluminescent dosimeter as claimed in claim 1 wherein:
    said plurality of different materials forming said dosimeter comprises a composite mixture of said different materials.

3. A thermoluminescent dosimeter as claimed in claim 1; wherein:
    each of said plurality of different materials responds to heat of different values.

4. A thermoluminescent dosimeter as claimed in claim 1; wherein:
    each of said plurality of different materials respond to heat of the same value, and
    said different materials are provided with heat delay means to delay light emission from each of said different materials while the different materials are simultaneously subjected to a constant heat source.

5. A thermoluminescent dosimeter as claimed in claim 2, wherein:
    the different materials are Li:F:Mg and $CaF_2$Mn.

6. A thermoluminescent dosimeter as claimed in claim 1, wherein:
    said plurality of different thermoluminescent materials are separate individual elements within said assembly.

7. A thermoluminescent dosimeter as claimed in claim 6, wherein:
    the different materials are selected from LiF:Mg, $CaF_2$:Mn, $Li^6F$:Mg, and $Li^7F$:Mg.

8. A thermoluminescent dosimetry system comprising:
    a mixture of different thermoluminescent materials assembled together into an assembly for detecting varying doses of different types of radiation,
    means for supporting said assembly,
    a thermoluminescence fluorimeter including means for heating the dosimeter assembly while detecting and amplifying light signals emitted from each of the component thermoluminescent materials, and displaying these individual signals separately.

9. A thermoluminescent dosimetry system as claimed in claim 8, in which:
    the light signals emitted from the component thermoluminescent materials are separated by their occurrence at different times during heating, such time differences being due to natural differences in thermal stability of the trapping centers.

10. A thermoluminescent dosimeter as claimed in claim 1, wherein:
    said plurality of different thermoluminescent materials are time differences being due to artificially induced delays in the heating of one material component relative to each other.

11. A thermoluminescent dosimetry system as claimed in claim 8; in which:
    the light signals emitted from the component thermoluminescent materials differ from one another in color, and including means allowing the fluorimeter to separate said signals by suitable optical filters and to amplify and display the signals individually.

12. A thermoluminescent dosimetry system as claimed in claim 8; in which:
    the component pieces of thermoluminescent materials are constrained in the composite dosimeter at a sufficient distance from one another that their individual light signals can be viewed during the heating by separate light-gathering channels and thus be detected, amplified, and displayed separately.

13. A thermoluminescent dosimetry system as claimed in claim 8; in which:
said support means includes a resistance heating means.

14. A method of detecting and simultaneously determining radiation dosage which comprises:
forming a single dosimeter unit with a plurality of different thermoluminescent materials that respond in varying degrees to different types of radiation,
exposing the dosimeter unit to a radiation field that may contain different types of radiation,
subjecting the dosimeter unit to a heat source to simultaneously heat each of the different materials of said dosimeter to produce light by thermoluminescence, detecting light emitted by said different materials to produce separate electrical output signals representative of the amount of light detected from each of said different materials,
recording the outputs to provide a record representative of the light output of each different material and comparing the recorded output with known records representative of known radiation sources to determine the amount and type of radiation incident on each of the different materials.

15. A method as claimed in claim 14 wherein:
said plurality of different thermoluminescent materials emit light at the same temperature and
each of said different materials are provided with separate heat delaying means in order to bring about emission of light at different times.

16. A method as claimed in claim 14 wherein:
the heat source is provided with a heat delay means and,
each of the different materials emit light when each of the different materials reach the same temperature.

References Cited

UNITED STATES PATENTS

| | | | |
|---|---|---|---|
| 3,239,665 | 3/1966 | Blase et al. | 250—71 X |
| 3,376,416 | 4/1968 | Rutland et al. | 250—71 X |
| 3,141,973 | 7/1964 | Heins et al. | 250—71 |
| 3,243,590 | 3/1966 | Forsman et al. | 250—71 X |

RALPH G. NILSON, Primary Examiner

D. L. WILLIS, Assistant Examiner

U.S. Cl. X.R.

250—71.5, 83, 83.1